July 6, 1965 I. J. DAVIES 3,193,222
PARACHUTE HAVING VARIABLE VENT AREA
Filed Nov. 12, 1963 3 Sheets-Sheet 1

Inventor
Ivor John Davies
By
Attorney

July 6, 1965     I. J. DAVIES     3,193,222
PARACHUTE HAVING VARIABLE VENT AREA
Filed Nov. 12, 1963     3 Sheets-Sheet 2

United States Patent Office 3,193,222
Patented July 6, 1965

3,193,222
PARACHUTE HAVING VARIABLE VENT AREA
Ivor John Davies, Netley Abbey, England, assignor to Hawker Siddeley Aviation Limited, London, England
Filed Nov. 12, 1963, Ser. No. 322,588
Claims priority, application Great Britain, Nov. 13, 1962, 42,925/62
5 Claims. (Cl. 244—145)

This invention relates to parachutes. Its object is to provide a parachute the retardation effect of which does not vary with the speed of the deployed parachute through the air in the same way as in the case of a conventional parachute.

One instance where it may be disadvantageous to employ a conventional parachute is in connection with aircraft ejector seats. Upon ejection, the seat and its occupant travel with considerable velocity and the deployment of a parachute, attached either to the seat or the man, under these circumstances may result in an abrupt deceleration imposing high and perhaps intolerable forces on the man.

According to the invention, a parachute has a variable vent the area of which changes automatically in dependence on the speed of the deployed parachute through the air. This can be accomplished by providing a vent opening with flaps that are drawn in by resilient means tending to reduce the area of the vent, the resilient means yielding to a variable extent in accordance with changing air pressure within the parachute dome.

Preferably, but not essentially, the vent is closed or substantially closed when the parachute is in the folded condition, the flaps then being held together by a tie that is weak in the sense that it breaks as soon as the parachute dome develops and fills with air on deployment.

Figure 1:
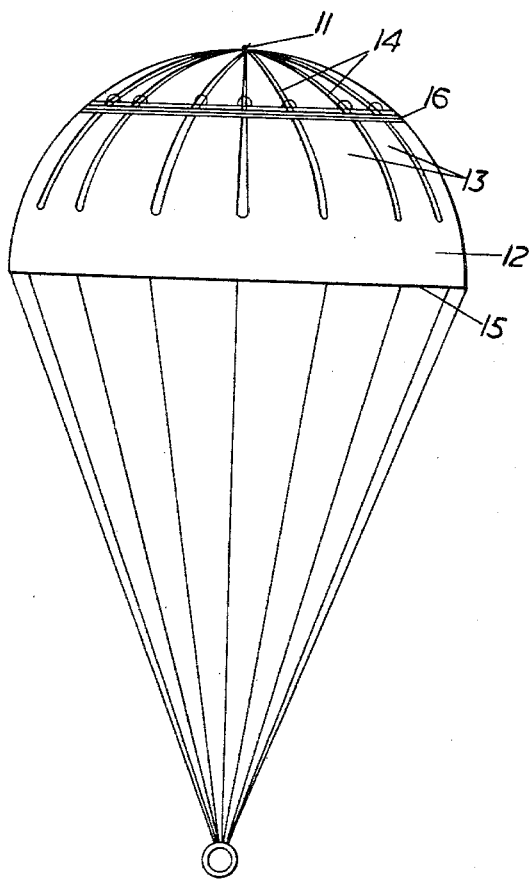
Figure 2:
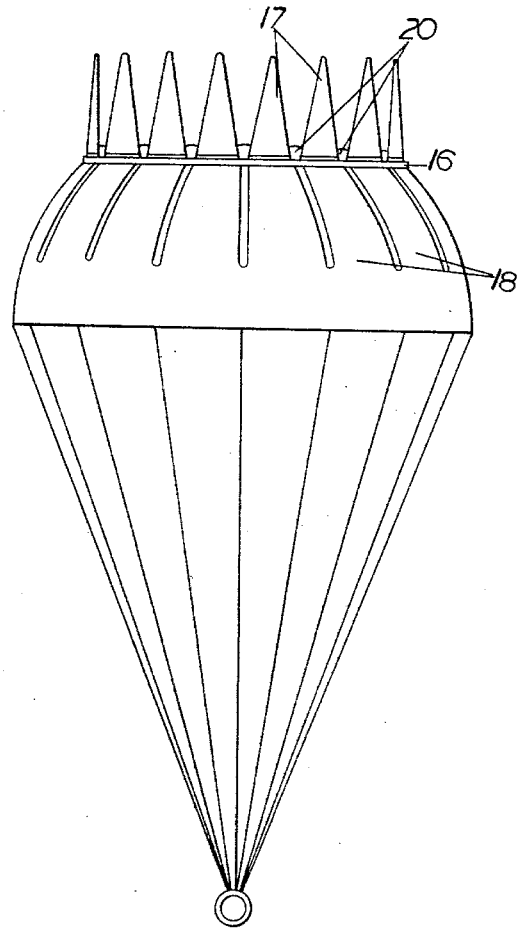
Figure 3:
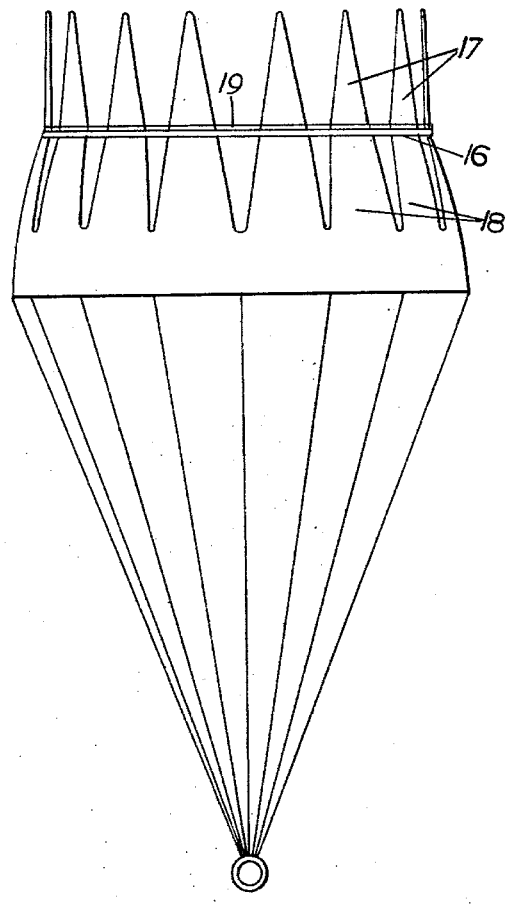

An example of a parachute in accordance with the invention will now be described with reference to the accompanying drawings. FIGURES 1, 2 and 3 of the drawings are three views in elevation of the deployed parachute in various operational stages.

FIGURE 1 shows the parachute while the break tie 11 is still intact, the dome 12 of the parachute then being of more or less conventional configuration. The break tie is at the central apex of the dome 12 and holds together a series of flaps 13, say sixteen flaps, making up the major portion of the dome.

The flaps 13 are in the form of petal type panels divided from one another by radial slits 14 in the dome fabric which slits extend outwardly and downwardly for the major portion of the distance from the centre of the dome to the periphery of the dome or parachute mouth 15. When the tie 11 breaks the flaps or panels 13 separate to form a comparatively large vent in the parachute dome.

At an intermediate position along the radial length of the panels 13, for example about half way, the dome is encircled by an elastic cord 16 that controls the area of the vent opening. FIGURE 2 of the drawings shows the parachute operating with minimum vent area, in which condition the break tie 11 has parted to release the portions 17 of the flaps that lie between the cord 16 and the parachute dome apex but the cord 16 has not stretched. Therefore, the portions 18 of the flaps outwardly and below the cord 16 are still closed up to one another.

FIGURE 3 of the drawings shows the condition of maximum vent area, in which the resilient cord 16 has stretched and the portions 18 of the flaps have parted. In order to define the maximum vent area, there is provided an inextensible cord 19 surrounding the parachute dome in association with the extensible cord 16. The restrictor cord 19 is taut in FIGURE 3 thereby preventing any further opening of the vent but in the condition of the parachute shown in FIGURE 2 there are loose loops 20 of the cord 19 at each slit between the flaps 13.

When the speed of the deployed parachute through the air is high the vent will open to its widest extent to allow the maximum loss of air from the dome. The deceleration effect exerted by the parachute will therefore be not nearly so great as in the case of a conventional parachute. As the speed through the air decreases due to the parachute drag, the air pressure within the parachute dome 12 will decrease and allow the flaps of the vent to close in toward one another progressively under the action of the elastic cord 16. Finally the minimum vent area condition depicted in FIGURE 2 of the drawings will be reached. This parachute is therefore able to decelerate an object or man to which it is attached comparatively smoothly, and certainly without the same abrupt deceleration or jerk that is experienced upon deployment of a conventional parachute.

The break tie ensures that the parachute will develop speedily and satisfactorily on deployment in the same way as a conventional parachute, and despite the existence of the vent, but will not always be necessary.

Mention of use of such a parachute with ejector seats has been made but this is not the only field of use. Parachutes according to the invention can be employed in normal parachute drops where too abrupt deceleration is a problem, and also to replace existing conventional aircraft brake parachutes.

I claim:

1. A parachute comprising a dome the fabric of which is divided into a plurality of petal type panels by slits radiating from the central apex of the dome which slits each extend for the major portion of the dome radius but do not reach the periphery of the dome, a resilient extensible cord encircling the dome coaxially with the apex thereof at a radial distance from the apex that locates the cord at an intermediate position along the length of the radiating slits, said cord defining a variable vent opening determined in area by the air pressure within the dome, and inextensible means interconnecting said panels and limiting the extent to which said panels can open out as said resilient cord yields thereby to define the area of the maximum vent opening.

2. A parachute according to claim 1, further comprising a break tie securing the extremities of the panels to one another at the dome apex which tie is strong enough to hold the panels together during initial deployment of the parachute but weak enough to break and release the panels when the parachute dome has filled.

3. A parachute according to claim 1 wherein said inextensible means comprises an inextensible cord encircling the dome in association with the extensible cord but longer than the natural length of the extensible cord, whereby the inextensible cord determines the maximum length to which said extensible cord extends.

4. A parachute comprising a dome the fabric of which is divided into a plurality of petal type panels by slits radiating from the central apex of the dome which slits each extend for the major portion of the dome radius but do not reach the periphery of the dome, a resilient extensible cord and an inextensible cord together encircling the dome coaxially with the apex thereof at a radial distance from the apex that locates the cords at an intermediate position along the length of the radiating slits, said resilient cord defining a variable vent opening determined in area by the air pressure within the dome, and said inextensible cord being longer than the natural length of the resilient cord and determining the maximum area to which said vent opening enlarges.

5. A parachute according to claim 4, further comprising a break tie securing the extremities of the panels to one another at the dome apex which tie is strong enough to hold the panels together during initial deployment of the parachute but weak enough to break and release the panels when the parachute dome has filled.

References Cited by the Examiner
UNITED STATES PATENTS

| 1,777,441 | 10/30 | Malmer | 244—145 |
| 2,520,533 | 8/50 | Dawes | 244—145 |
| 2,559,804 | 7/51 | Smith | 244—152 |

FERGUS S. MIDDLETON, *Primary Examiner.*